(12) United States Patent
Tsen et al.

(10) Patent No.: US 7,280,043 B2
(45) Date of Patent: Oct. 9, 2007

(54) APPARATUS FOR IMPEDING COUNTERFEITING, IMPEDING STEALING AND MANAGING OPTICAL DISK STOCK

(75) Inventors: Yuh-Jou Tsen, Kao Hsiung (TW); Chih-Chen Chang, Panchiao (TW); Yung-Chin Lo, Chang Hua Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 140 days.

(21) Appl. No.: 11/124,078

(22) Filed: May 9, 2005

(65) Prior Publication Data

US 2006/0250244 A1    Nov. 9, 2006

(51) Int. Cl.
*G08B 13/14* (2006.01)
(52) U.S. Cl. .............................. 340/572.1; 340/572.7; 340/572.8; 340/572.9; 369/53.2; 369/275.1
(58) Field of Classification Search .. 340/572.1–572.9; 713/182, 193; 369/47.11, 53.2, 275.1, 274, 369/52.1, 375; 235/454, 492, 488
See application file for complete search history.

(56) References Cited

U.S. PATENT DOCUMENTS 6,441,740 B1 * 8/2002 Brady et al. ............. 340/572.7

| | | |
|---|---|---|
| 2003/0034400 A1 | 2/2003 | Han et al. |
| 2003/0090380 A1* | 5/2003 | Hasegawa ................. 340/572.6 |
| 2004/0052202 A1 | 3/2004 | Brollier |
| 2004/0052203 A1* | 3/2004 | Brollier ....................... 369/273 |
| 2004/0054594 A1 | 3/2004 | Forster et al. |
| 2005/0151651 A1* | 7/2005 | Tan et al. .................. 340/572.7 |
| 2005/0270964 A1* | 12/2005 | Ujino ........................ 369/274 |
| 2006/0067187 A1* | 3/2006 | Yang et al. .............. 369/47.11 |
| 2006/0071795 A1* | 4/2006 | Benedikt ................. 340/572.7 |
| 2006/0101272 A1* | 5/2006 | Muller ........................ 713/182 |

* cited by examiner

*Primary Examiner*—Jeffery Hofsass
*Assistant Examiner*—Hoi C. Lau
(74) *Attorney, Agent, or Firm*—Rabin & Berdo, P.C.

(57) ABSTRACT

An apparatus for impeding counterfeiting, impeding stealing and managing optical disk stock is described. The radio frequency identification (RFID) system is applied in an apparatus for impeding counterfeiting, impeding stealing, and managing optical disk stock. The apparatus has a disc, a RFID chip and an antenna. The disc has a first annular area, a second annular area and a third annular area. The second annular area is a data recording area with a metal recording layer. The first annular area and the third annular area both are areas without data. The RFID chip is embedded in the disc and the antenna connects to the RFID chip. The RFID chip and the antenna are located in the third annular area. The apparatus further has a foldable matching circuit to increase an inductance of the antenna and shorten the length of the antenna with even poles.

36 Claims, 9 Drawing Sheets

APPARATUS FOR IMPEDING COUNTERFEITING, IMPEDING STEALING AND MANAGING OPTICAL DISK STOCK

BACKGROUND OF THE INVENTION

1. Field of the Invention

The present invention relates to an apparatus for impeding counterfeiting, impeding stealing and managing optical disk stock. In particular, the present invention applies the radio frequency identification (RFID) system to an apparatus that can impede counterfeiting, impede stealing and manage stocks for optical discs.

2. Description of the Related Art

RFID has many advantages. For example, RFID can be read by a non-contact method. Data stored therein can be updated. RFID has a large data capacity and can be used repeatedly. More than one RFID tag can be read at one time. RFID provides good security for data. RFID is an acceptable replacement for the bar-code system. RFID also doesn't need manpower during the identification process and can be operated in environments with oil sludge and heavy dust.

Because optical discs, such as audio discs, video discs and data discs CD, VCD, CD-ROM and DVD, can be illegally and easily duplicated, legal manufacturers lose a lot of money, the creative will of the original creator is reduced, and the development of the software industry is obstructed. Therefore, stopping counterfeiting and copyright protection are considered urgent issues. Stolen discs also easily affect retail sales.

Due to the development of the semiconductor manufacturing process and the operating frequency of the RFID, the volume of the RFID tag has become smaller. An RFID tag can be embedded in a disc and the identification rate of the RFID tag reaches almost 100% due to the development of the RFID technology. An RF-EAS (electronic article surveillance) adapted to the RFID technology is a good solution for these issues. Therefore, many solutions with RFID technology are disclosed to solve the issues of counterfeiting, stealing and stocks management.

The technology for embedding an RFID tag in a disc of the prior art embeds the RFID tag in a blank central area of a disc. The U.S. publication patents, such as US 2003/0034400A1, US 2004/0054594A1 and US 2004/0052202A1, disclose a technology where an RFID tag is embedded in the blank central area of the disc. This method provides a larger space to embed the RFID tag and reduces the balance problem when the disc is rotated at a high speed. However, the readable distance between the tag reader and the RFID tag is very short because the antenna radiation field is affected by the metal parts of the disc and the quantity of discs.

Besides, because the input impedance of the RFID chip has a larger capacity, the prior art that adopts a simple even antenna needs an antenna longer than one wavelength of the radio frequency to provide a larger inductance.

SUMMARY OF THE INVENTION

The present invention provides an apparatus for impeding counterfeiting, impeding stealing and managing optical disk stock. The present invention applies a radio frequency identification (RFID) system to an apparatus that can impede counterfeiting, impede stealing and manage optical disk stock.

In one aspect, the present invention provides an apparatus for impeding counterfeiting, impeding stealing and managing optical disk stock. The present invention symmetrically embeds an RFID chip into an exterior area of a disc to solve the issue of imbalance when the disc is rotated at a high speed and to increase the readable distance.

In another aspect, the present invention provides an apparatus for impeding counterfeiting, impeding stealing and managing optical disk stock. The present invention aligns the two poles of the RFID chip to the exterior surface of the disc. Therefore, the two ends of the antenna also are pasted on the exterior surface of the disc and directly connect to the two poles of the RFID chip to simplify the manufacturing process of the disc.

In another aspect, the present invention provides an apparatus for impeding counterfeiting, impeding stealing and managing optical disk stock. The present invention symmetrically embeds the RFID chip in the exterior area of the disc and adds a foldable matching circuit to increase an inductance of the antenna with even poles. This can shorten the length of the antenna with even poles.

In another aspect, the present invention provides an apparatus for impeding counterfeiting, impeding stealing and managing optical disk stock. The present invention symmetrically embeds an RFID chip into a rim of a disc and prints an antenna made of conducting material on the rim of the disc. The present invention solves the issue of imbalance when the disc is rotated at a high speed and increases the readable distance.

The apparatus for impeding counterfeiting, impeding stealing and managing optical disk stock of the present invention comprises a disc, a RFID chip and an antenna. The disc includes a first annular area, a second annular area and a third annular area. The second annular area is a data recording area with a metal recording layer. The first annular area and the third annular area both are an area without data. The second annular area wraps around the first annular area and the third annular area wraps around the second annular area. The RFID chip is embedded in the disc and the antenna connects to the RFID chip. The RFID chip and the antenna are located in the third annular area.

The apparatus for impeding counterfeiting, impeding stealing and managing optical disk stock of the present invention further comprises a foldable matching circuit to increase an inductance of the antenna and shorten the length of the antenna with even poles.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
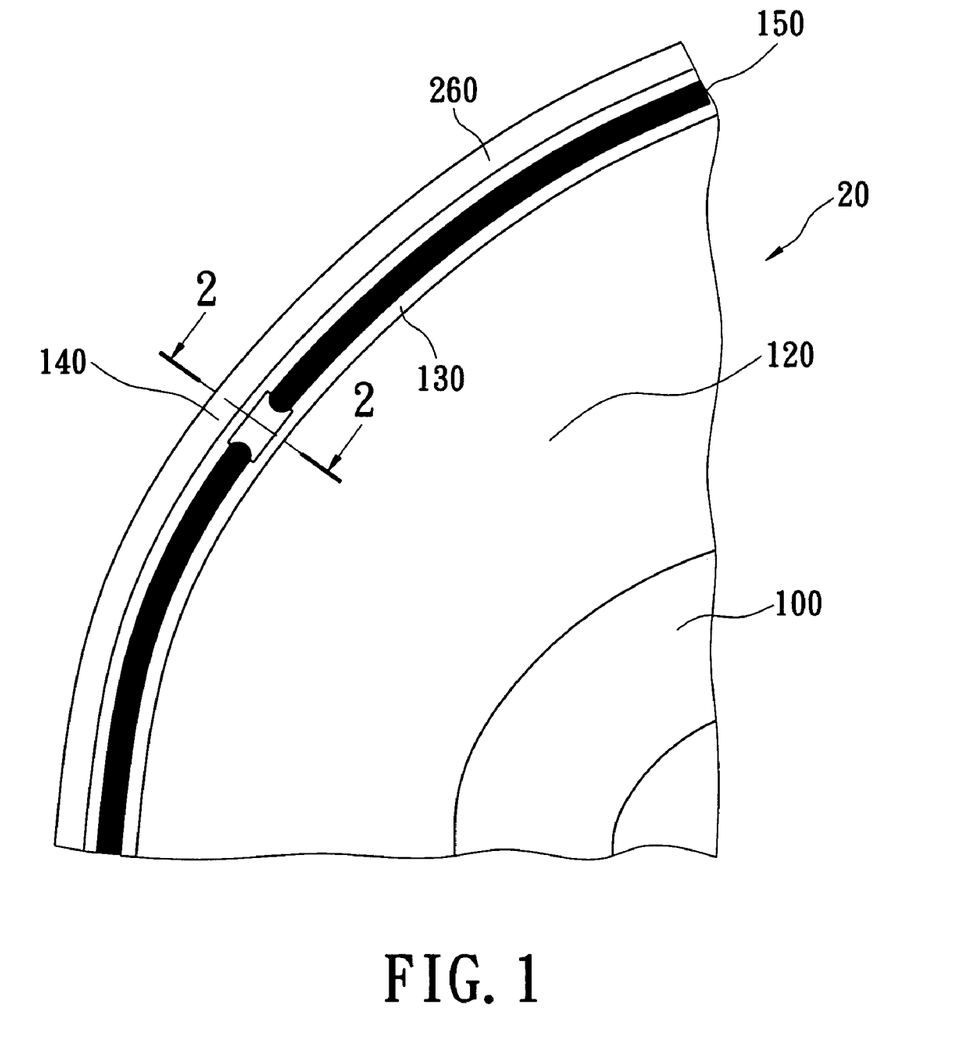
FIG. 1 is a schematic view of the first embodiment of an apparatus for impeding counterfeiting, impeding stealing and managing optical disk stock of the present invention.

Reference is made to FIG. 1, which shows a schematic view of the first embodiment of an apparatus for impeding counterfeiting, impeding stealing and managing optical disk stock of the present invention. The RFID chip 140 receives the power via the antenna 150 and provides the power to the interior analog and digital circuit of the RFID chip 140. The coded information of the RFID chip 140 can thus be transmitted to the tag reader for impeding counterfeiting, impeding stealing and managing optical disk stock 20. The disc 20 is, for example, a CD, DVD, or Blue-Ray disc, which can be read by a non-contact method via laser.

The present invention embeds a RFID chip 140 into an annular area of a disc 20. The disc 20 includes a first annular area 100, a second annular area 120 and a third annular area 130. The second annular area 120 is a data recording area with a metal recording layer. The first annular area 100 and the third annular area 130 both are an area without data. The second annular area 120 wraps around the first annular area 100 and the third annular area 130 wraps around the second annular area 120. The disc 20, from inside to outside, is the first annular area 100, the second annular area 120 and the third annular area 130. In other words, the third annular area 130 is located in the exterior part of the disc 20.

Figure 2:
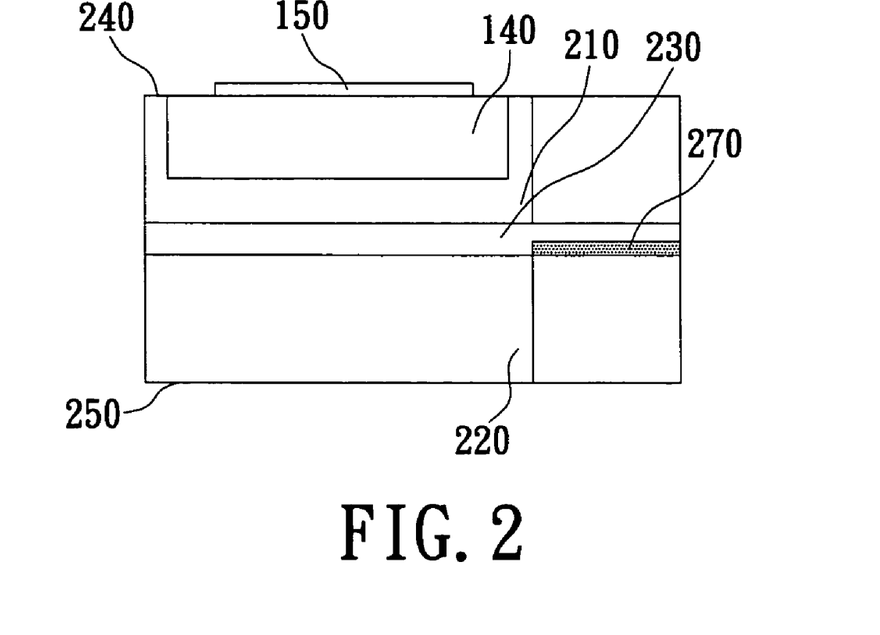
FIG. 2 is a cross-sectional view of the RFID chip embedded in the disc of the first embodiment of an apparatus for impeding counterfeiting, impeding stealing and managing optical disk stock of the present invention.

The disc 20 can be composed of two annular discs with a thickness 600 μm, such as a DVD, or by one annular disc with a thickness of 1200 μm, such as a CD. The disc 20 composed of two annular discs with a thickness of 600 μm includes an upper annular disc 210, a lower annular disc.220 and an adhesive layer 230. FIG. 2 shows a cross-sectional view of the RFID chip 140 embedded in the disc 20. The cross-sectional view comes from cutting the disc along cutting line 2 in FIG. 1. The RFID chip 140 is vertically embedded in the exterior surface 240 of the upper annular disc 210 and is located in the third annular area 130 of the upper annular disc 210. The exterior surface of the RFID chip 140 is aligned with the exterior surface 240 of the upper annular disc 210 and the antenna 150 is pasted on the exterior surface 240 of the upper annular disc 210. The material of the antenna 150 is, for example, conducting ink or conducting material. The two poles of the RFID chip 140 directly contacts the two ends of the antenna 150. The power and the signal emitted from the tag reader are transmitted to the RFID chip 140 via the antenna 150. There is an adhesive layer 230 with a thickness of 60 μm between the two annular discs 210, 220 to separate the upper annular disc 210 and a metal layer 270. Data is recorded on the metal layer 270.

Figure 3:
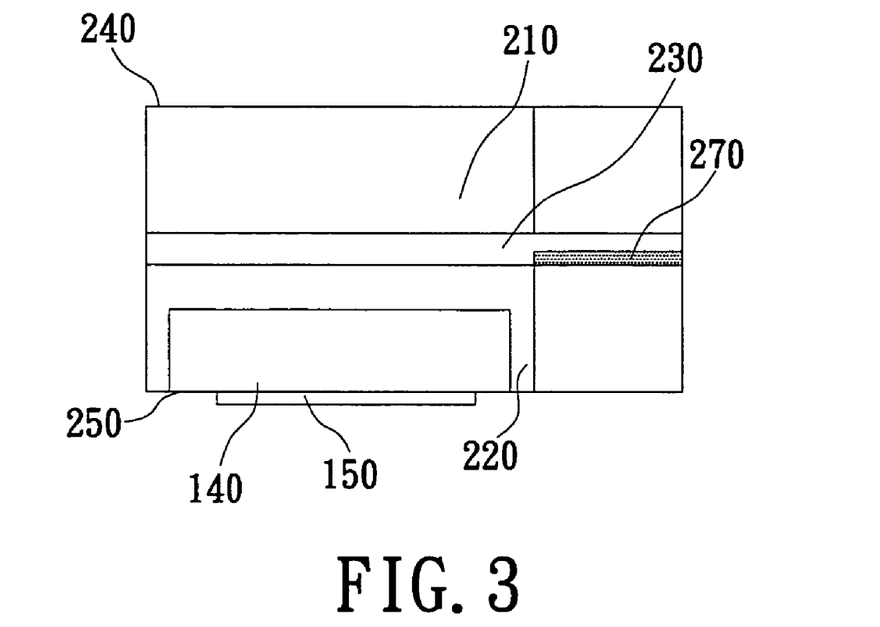
FIG. 3 is another cross-sectional view of the RFID chip embedded in the disc of the first embodiment of an apparatus for impeding counterfeiting, impeding stealing and managing optical disk stock of the present invention.

FIG. 3 shows another cross-sectional view of the RFID chip 140 embedded in the disc 20. The RFID chip 140 is vertically embedded in the exterior surface 250 of the lower annular disc 220 and is located in the third annular area 130 of the lower annular disc 220. The exterior surface of the RFID chip 140 is aligned with the exterior surface 250 of the lower annular disc 220 and the antenna 150 is pasted on the exterior surface 250 of the lower annular disc 220. The material of the antenna 150 is, for example, conducting ink or conducting material. The two poles of the RFID chip 140 directly contact the two ends of the antenna 150. The power and the signal emitted from the tag reader are transmitted to the RFID chip 140 via the antenna 150.

When the disc is composed of one annular disc (not shown in the figure), the RFID chip 140 is embedded in an upper surface or a lower surface of the third annular area 130. The exterior surface of the RFID chip 140 is aligned with the upper surface or the lower surface of the third annular area 130 and the antenna is pasted on the upper surface or the lower surface of the third annular area 130.

Figure 4:
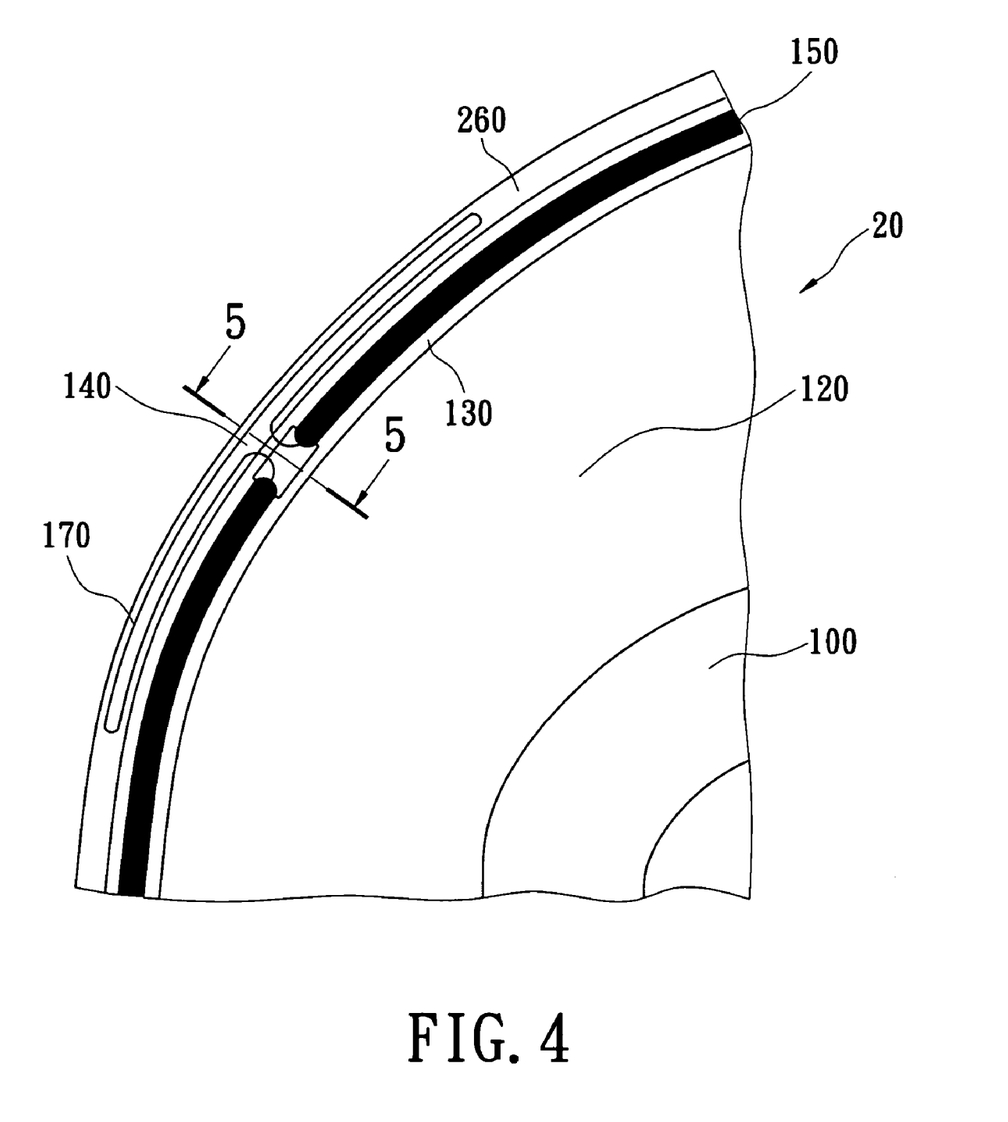
FIG. 4 is a schematic view of the second embodiment of an apparatus for impeding counterfeiting, impeding stealing and managing optical disk stock of the present invention.
Figure 5:
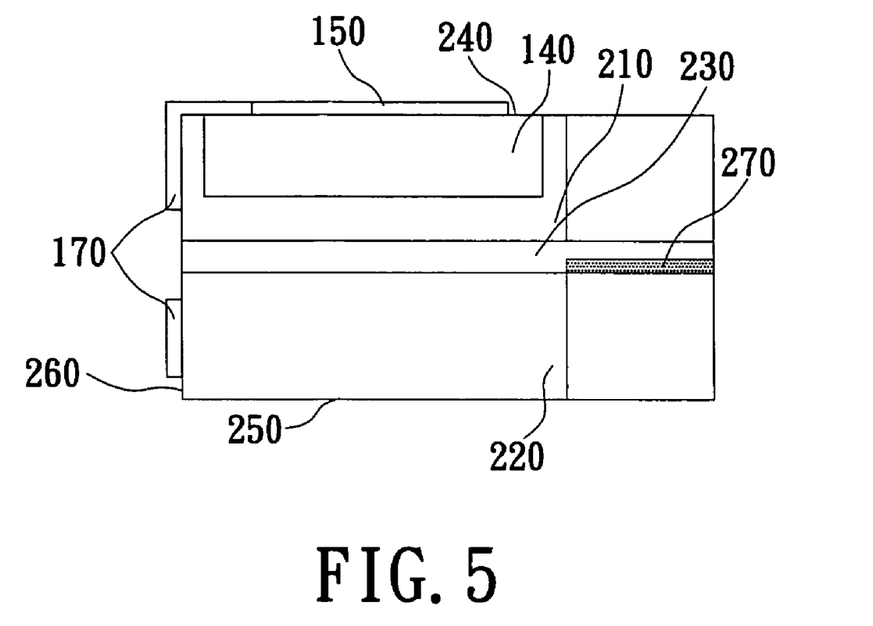
FIG. 5 is a cross-sectional view of the RFID chip embedded in the disc of the second embodiment of an apparatus for impeding counterfeiting, impeding stealing and managing optical disk stock of the present invention.

Reference is made to FIG. 4, which shows a schematic view of the second embodiment of an apparatus for impeding counterfeiting, impeding stealing and managing optical disk stock of the present invention. Because the input resistance of the RFID chip 140 has a larger capacity, a single antenna with even poles cannot provide larger impedance. The second embodiment of an apparatus for impeding counterfeiting, impeding stealing and managing optical disk stock of the present invention adds a foldable matching circuit 170 in the disc 20. FIG. 5 shows a cross-sectional view of the RFID chip 140 embedded in the disc 20 of the second embodiment. The cross-sectional view comes from cutting the disc along cutting line 5 in FIG. 4. The RFID chip 140 is vertically embedded in the exterior surface 240 of the upper annular disc 210 and is located in the third annular area 130 of the upper annular disc 210. The exterior surface of the RFID chip 140 is aligned with the exterior surface 240 of the upper annular disc 210 and the antenna 150 is pasted on the exterior surface 240 of the upper annular disc 210. The two poles of the RFID chip 140 directly contacts the two ends of the antenna 150. The foldable matching circuit 170 is pasted on the side surface 260 of the third annular area 130 of the disc 20 with a thickness of 1.2 mm. The material of the antenna 150 and the foldable matching circuit 170 is, for example, conducting ink or conducting material. The power and the signal emitted from the tag reader are transmitted to the RFID chip 140 via the antenna 150.

Figure 6:
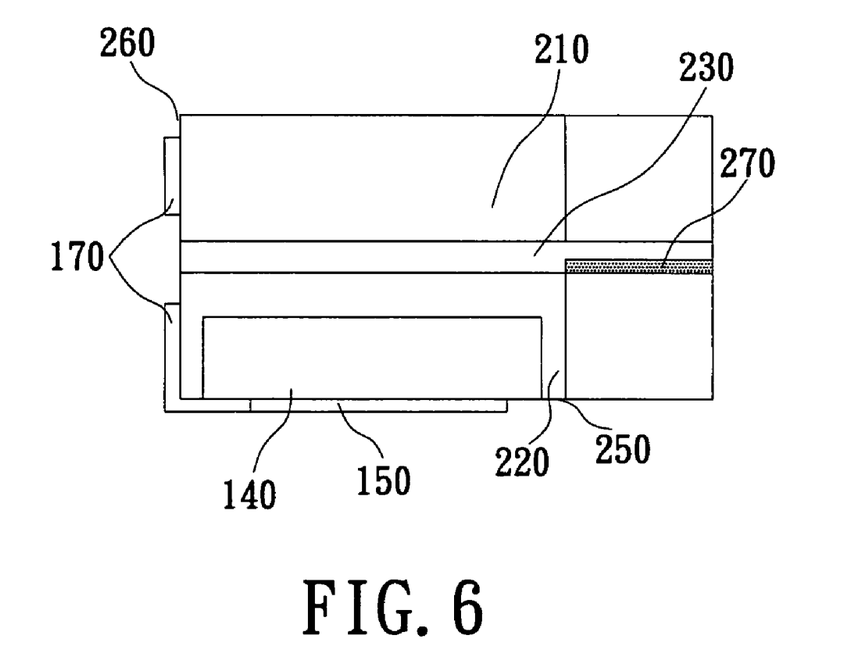
FIG. 6 is another cross-sectional view of the RFID chip embedded in the disc of the second embodiment of an apparatus for impeding counterfeiting, impeding stealing and managing optical disk stock of the present invention.

FIG. 6 shows another cross-sectional view of the RFID chip 140 embedded in the disc 20 of the second embodiment. The RFID chip 140 is vertically embedded in the exterior surface 250 of the lower annular disc 220 and is located in the third annular area 130 of the lower annular disc 220. The exterior surface of the RFID chip 140 is aligned with the exterior surface 250 of the lower annular disc 220 and the antenna 150 is pasted on the exterior surface 250 of the lower annular disc 220. The two poles of the RFID chip 140 directly contact the two ends of the antenna 150. The foldable matching circuit 170 is pasted on the side surface 260 of the third annular area 130 of the disc 20 with a thickness of 1.2 mm. The material of the antenna 150 and the foldable matching circuit 170 are, for example, conducting ink or conducting material. The power and the signal emitted from the tag reader are transmitted to the RFID chip 140 via the antenna 150.

When the disc is composed of one annular disc (not shown in the figure), the RFID chip 140 is embedded in an upper surface or a lower surface of the third annular area 130. The exterior surface of the RFID chip 140 is aligned with the upper surface or the lower surface of the third annular area 130 and the antenna is pasted on the upper surface or the lower surface of the third annular area 130. The foldable matching circuit 170 is pasted on the side surface 260 of the third annular area 130 of the disc 20 with a thickness of 1.2 mm.

Figure 7:
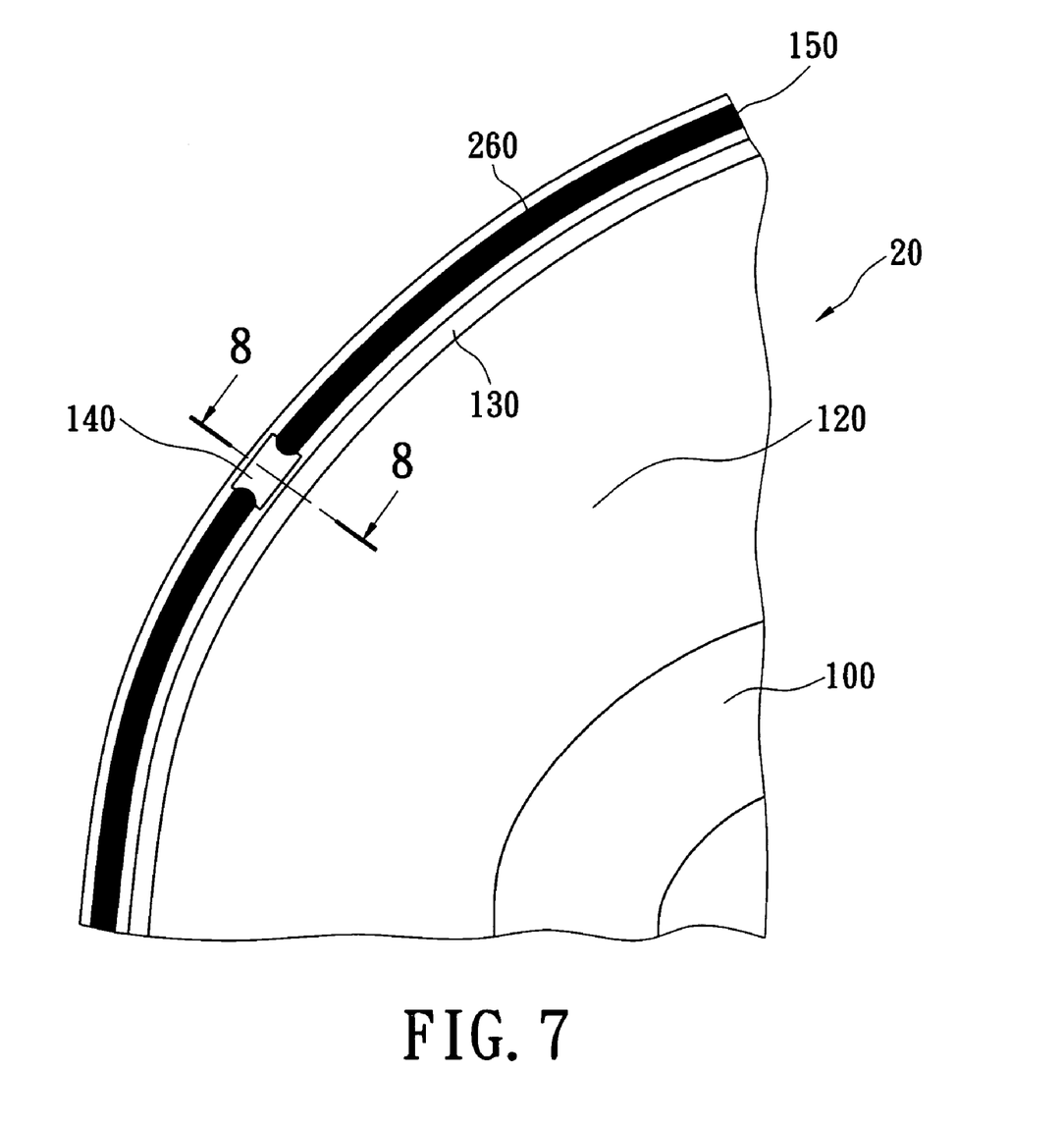
FIG. 7 is a schematic view of the third embodiment of an apparatus for impeding counterfeiting, impeding stealing and managing optical disk stock of the present invention.
Figure 8:
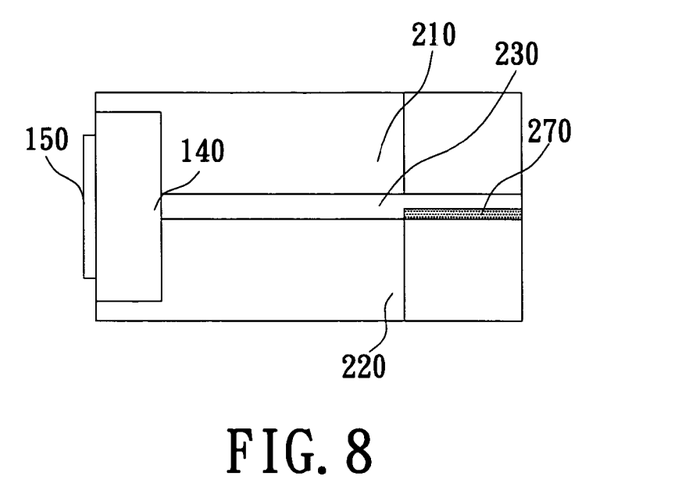
FIG. 8 is a cross-sectional view of the RFID chip embedded in the disc of the third embodiment of an apparatus for impeding counterfeiting, impeding stealing and managing optical disk stock of the present invention.

Reference is made to FIG. 7, which shows a schematic view of the third embodiment of an apparatus for impeding counterfeiting, impeding stealing and managing optical disk stock of the present invention. FIG. 8 shows a cross-sectional view of the RFID chip 140 embedded in the disc 20 of the third embodiment. The cross-sectional view comes from cutting the disc along cutting line 8 in FIG. 7. The RFID chip 140 is vertically embedded in the side surface 260 of the third annular area 130 and is located in the third annular area 130. The exterior surface of the RFID chip 140 is aligned with the side surface 260 of the third annular area 130 of the disc 20. The antenna 150 is pasted on the side surface 260 of the third annular area 130. The material of the antenna 150 is, for example, conducting ink or conducting material. The two poles of the RFID chip 140 directly contact the two ends of the antenna 150. The power and the signal emitted from the tag reader are transmitted to the RFID chip 140 via the antenna 150.

Figure 9:
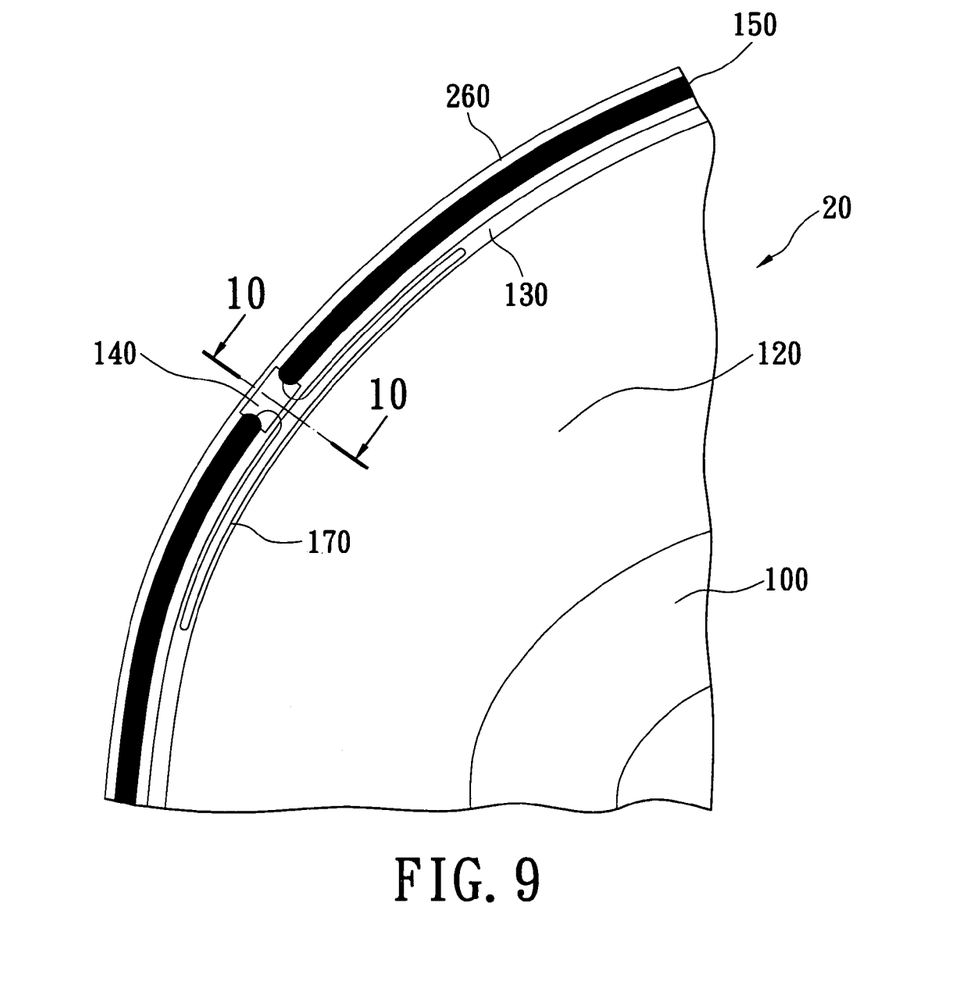
FIG. 9 is a schematic view of the fourth embodiment of an apparatus for impeding counterfeiting, impeding stealing and managing optical disk stock of the present invention.
Figure 10:
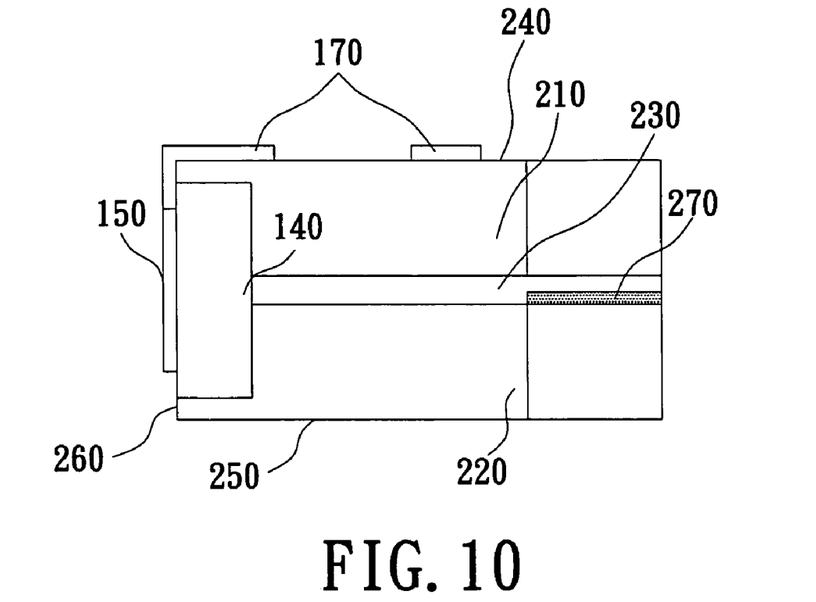
FIG. 10 is a cross-sectional view of the RFID chip embedded in the disc of the fourth embodiment of an apparatus for impeding counterfeiting, impeding stealing and managing optical disk stock of the present invention.

Reference is made to FIG. 9, which shows a schematic view of the fourth embodiment of an apparatus for impeding counterfeiting, impeding stealing and managing optical disk stock of the present invention. Because the input resistance of the RFID chip 140 has a larger capacity, a single antenna with even poles can't provide larger impedance. The fourth embodiment of an apparatus for impeding counterfeiting, impeding stealing and managing optical disk stock of the present invention adds a foldable matching circuit 170 to the disc 20. FIG. 10 shows a cross-sectional view of the RFID chip 140 embedded in the disc 20 of the fourth embodiment. The cross-sectional view comes from cutting the disc along cutting line 10 in FIG. 9. The RFID chip 140 is vertically embedded in the side surface 260 of the third annular area 130 and is located in the third annular area 130. The exterior surface of the RFID chip 140 is aligned with the side surface 260 of the third annular area 130 of the disc 20. The antenna 150 is pasted on the side surface 260 of the third annular area 130. The two poles of the RFID chip 140 directly contact the two ends of the antenna 150. The foldable matching circuit 170 is pasted on the exterior surface 240 of the third annular area 130 of the upper annular disc 210. The material of the antenna 150 and the foldable matching circuit 170 are, for example, conducting ink or conducting material. The power and the signal emitted from the tag reader are transmitted to the RFID chip 140 via the antenna 150.

Figure 11:
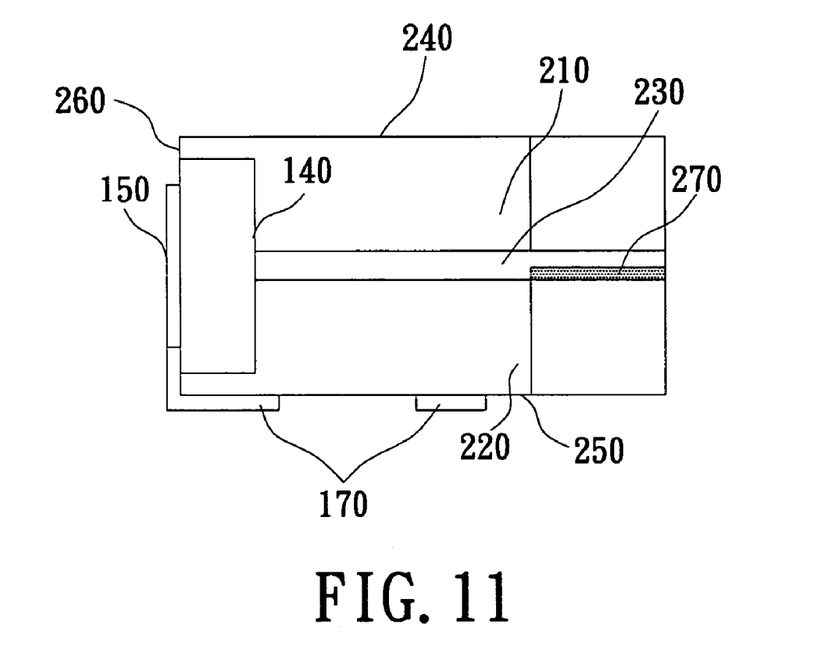
FIG. 11 is another cross-sectional view of the RFID chip embedded in the disc of the fourth embodiment of an apparatus for impeding counterfeiting, impeding stealing and managing optical disk stock of the present invention.

FIG. 11 shows another cross-sectional view of the RFID chip 140 embedded in the disc 20 of the fourth embodiment. The cross-sectional view comes from cutting the disc along cutting line 10 in FIG. 9. The RFID chip 140 is vertically embedded in the side surface 260 of the third annular area 130 and is located in the third annular area 130. The exterior surface of the RFID chip 140 is aligned with the side surface 260 of the third annular area 130 of the disc 20. The antenna 150 is pasted on the side surface 260 of the third annular area 130. The two poles of the RFID chip 140 directly contact the two ends of the antenna 150. The foldable matching circuit 170 is pasted on the exterior surface 250 of the third annular area 130 of the lower annular disc 220. The material of the antenna 150 and the foldable matching circuit 170 are, for example, conducting ink or conducting material. The power and the signal emitted from the tag reader are transmitted to the RFID chip 140 via the antenna 150.

Figure 12:
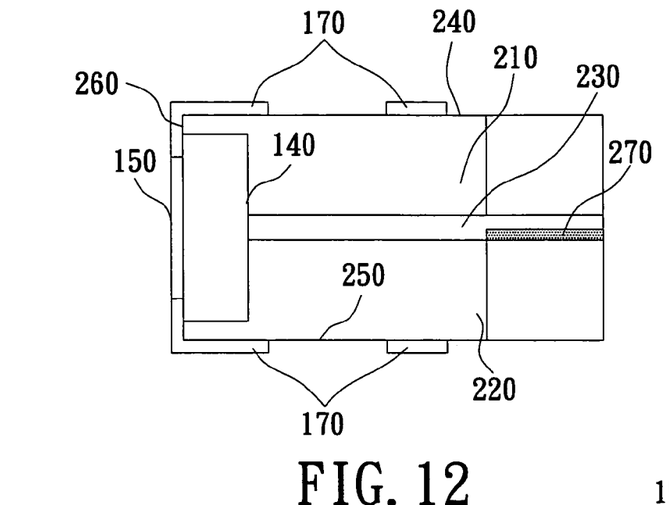
FIG. 12 is another cross-sectional view of the RFID chip embedded in the disc of the fourth embodiment of an apparatus for impeding counterfeiting, impeding stealing and managing optical disk stock of the present invention.

FIG. 12 shows a third cross-sectional view of the RFID chip 140 embedded in the disc 20 of the fourth embodiment. The cross-sectional view comes from cutting the disc along cutting line 10 in FIG. 9. The RFID chip 140 is vertically embedded in the side surface 260 of the third annular area 130 and is located in the third annular area 130. The exterior surface of the RFID chip 140 is aligned with the side surface 260 of the third annular area 130 of the disc 20. The antenna 150 is pasted on the side surface 260 of the third annular area 130. The two poles of the RFID chip 140 directly contact the two ends of the antenna 150. The foldable matching circuit 170 is pasted on the exterior surface 240 of the third annular area 130 of the upper annular disc 210 and the exterior surface 250 of the third annular area 130 of the lower annular disc 220. The material of the antenna 150 and the foldable matching circuit 170 are, for example, conducting ink or conducting material. The power and the signal emitted from the tag reader are transmitted to the RFID chip 140 via the antenna 150.

When the disc is composed of one annular disc (not shown in the figure), the RFID chip 140 is embedded in a side surface 260. The exterior surface of the RFID chip 140 is aligned with the side surface 260 of the third annular area 130 and the antenna is pasted on the side surface of the third annular area 130. The foldable matching circuit 170 is pasted on the upper surface and the lower surface of the third annular area 130.

Figure 13:
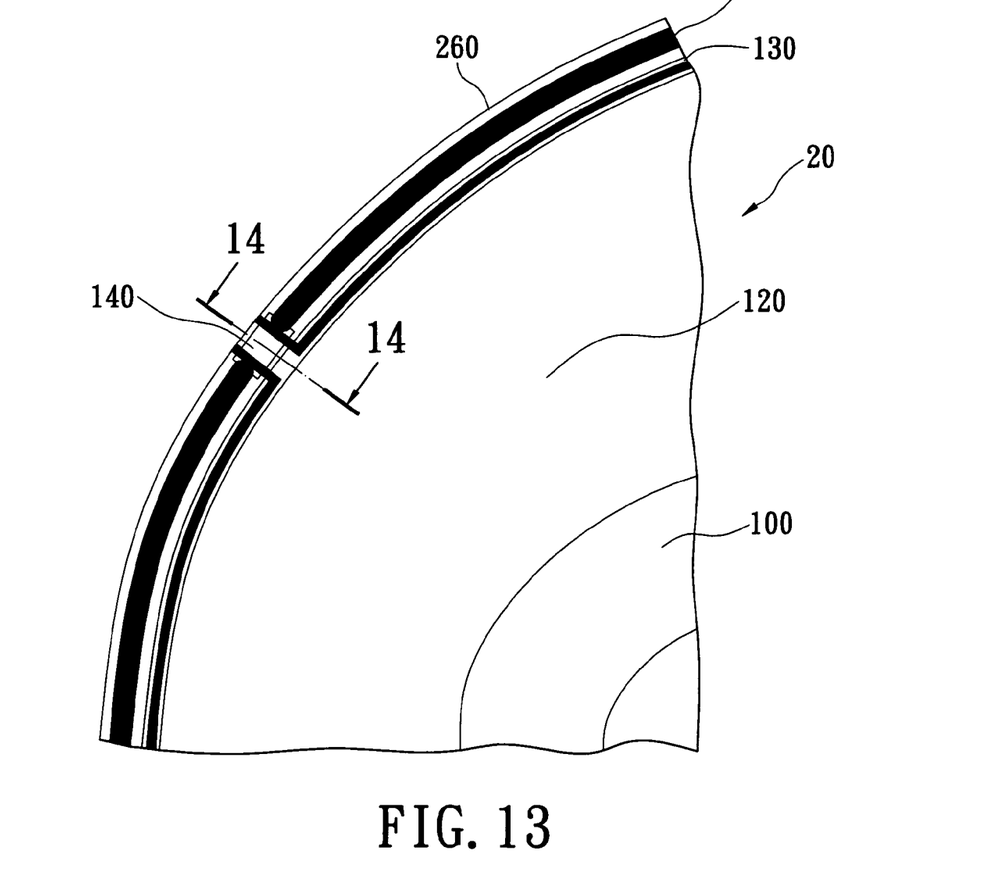
FIG. 13 is a schematic view of the fifth embodiment of an apparatus for impeding counterfeiting, impeding stealing and managing optical disk stock of the present invention.
Figure 14:
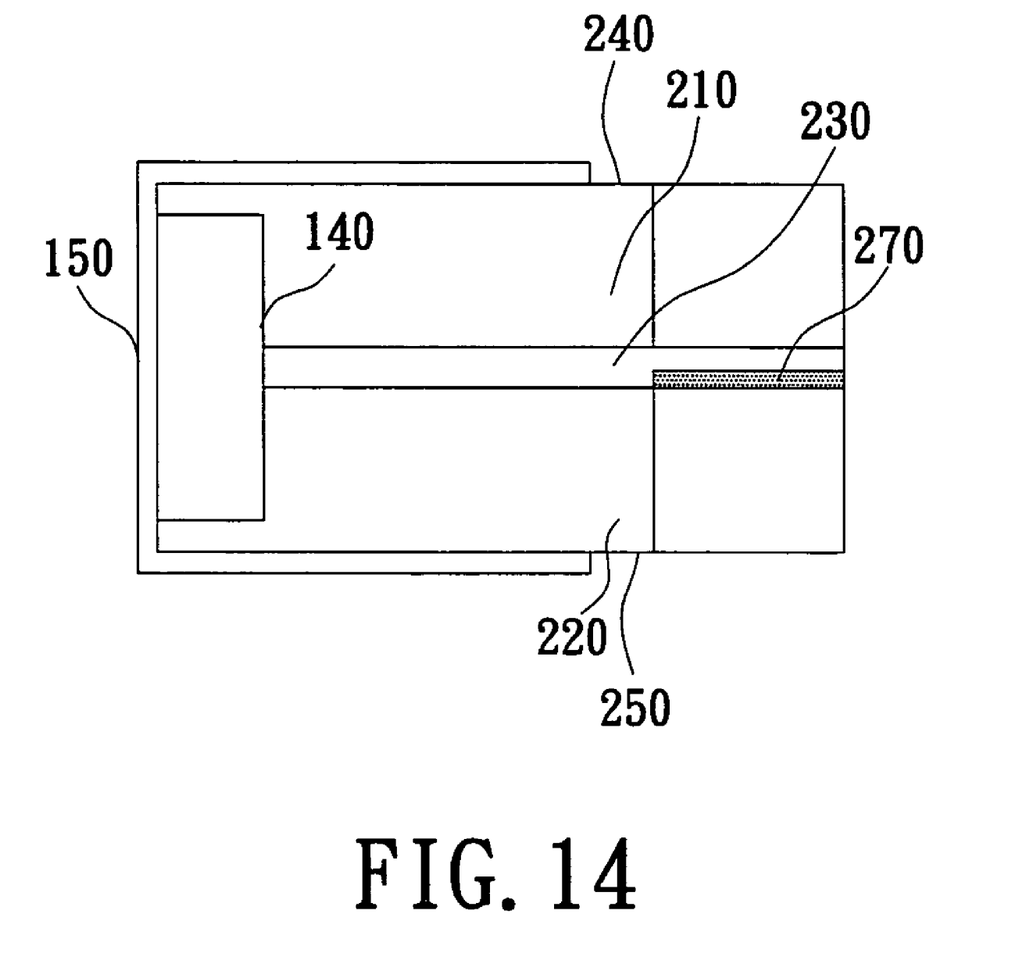
FIG. 14 is a cross-sectional view of the RFID chip embedded in the disc of the fifth embodiment of an apparatus for impeding counterfeiting, impeding stealing and managing optical disk stock of the present invention.

Reference is made to FIG. 13, which shows a schematic view of the fifth embodiment of an apparatus for impeding counterfeiting, impeding stealing and managing optical disk stock of the present invention. FIG. 14 shows a cross-sectional view of the RFID chip 140 embedded in the disc 20 of the fifth embodiment. The cross-sectional view comes from cutting the disc along cutting line 14 in FIG. 13. The RFID chip 140 is vertically embedded in the side surface 260 of the third annular area 130 and is located in the third annular area 130. The exterior surface of the RFID chip 140 is aligned with the side surface 260 of the third annular area 130 of the disc 20. The antenna 150 is pasted on the side surface 260 of the third annular area 130, the exterior surface 240 of the upper annular disc 210 and the exterior surface 250 of the lower annular disc 220. The material of the antenna 150 is, for example, conducting ink or conducting material. The two poles of the RFID chip 140 directly contact the two ends of the antenna 150. The power and the signal emitted from the tag reader are transmitted to the RFID chip 140 via the antenna 150.

The present invention embeds a RFID tag into the third annular area 130 of a disc 20. The third annular area 130 is located on the external area outside the data area of the disc. The readable distance of the RFID tag is not shortened when discs are stacked. The present invention also increases the identification efficiency even when the discs are lined up parallel to each other. When the RFID chips are symmetrically embedded in the third annular area of the disc by even quantity and the type of the antenna is also symmetrical, the present invention solves the issue of imbalance when the disc is rotated at a high speed. The present invention has the functions of impeding counterfeiting, impeding stealing and managing optical disk stock.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An apparatus for impeding counterfeiting, impeding stealing and managing optical disk stock, comprising:
    a disc, including a first annular area, a second annular area and a third annular area, wherein the second annular area is a data recording area with a metal recording layer, the first annular area and the third annular area both are areas without data, the second annular area wraps around the first annular area, and the third annular area wraps around the second annular area;
    an RFID chip embedded in the disc;
    an antenna connecting to the RFID chip; and
    a foldable matching circuit connecting to the antenna, wherein the foldable matching circuit is located on, and wrapped around a peripheral edge of the third annular area of the disc;
    wherein the RFID chip and the antenna are located in the third annular area.

2. The apparatus for impeding counterfeiting, impeding stealing and managing optical disk stock of claim 1, wherein the RFID chip is vertically embedded in an upper surface of the third annular area of the disc.

3. The apparatus for impeding counterfeiting, impeding stealing and managing optical disk stock of claim 1, wherein the RFID chip is vertically embedded in a lower surface of the third annular area of the disc.

4. The apparatus for impeding counterfeiting, impeding stealing and managing optical disk stock of claim 1, wherein the disc comprises an upper annular disc and a lower annular disc, and the RFID chip is vertically embedded in the upper annular disc.

5. The apparatus for impeding counterfeiting, impeding stealing and managing optical disk stock of claim 1, wherein the disc comprises an upper annular disc and a lower annular disc, and the RFID chip is vertically embedded in the lower annular disc.

6. The apparatus for impeding counterfeiting, impeding stealing and managing optical disk stock of claim 1, wherein a quantity of the RFID chip is even and the RFID chip is symmetrically embedded in the disc.

7. The apparatus for impeding counterfeiting, impeding stealing and managing optical disk stock of claim 2, wherein an exterior surface of the RFID chip is aligned with the upper surface of the third annular area of the disc.

8. The apparatus for impeding counterfeiting, impeding stealing and managing optical disk stock of claim 3, wherein an exterior surface of the RFID chip is aligned with the lower surface of the third annular area of the disc.

9. The apparatus for impeding counterfeiting, impeding stealing and managing optical disk stock of claim 4, wherein an exterior surface of the RFID chip is aligned with an exterior surface of the upper annular disc of the disc.

10. The apparatus for impeding counterfeiting, impeding stealing and managing optical disk stock of claim 5, wherein an exterior surface of the RFID chip is aligned with an exterior surface of the lower annular disc of the disc.

11. The apparatus for impeding counterfeiting, impeding stealing and managing optical disk stock of claim 1, wherein the antenna is pasted on an upper surface of the third annular area of the disc.

12. The apparatus for impeding counterfeiting, impeding stealing and managing optical disk stock of claim 1, wherein the antenna is pasted on a lower surface of the third annular area of the disc.

13. The apparatus for impeding counterfeiting, impeding stealing and managing optical disk stock of claim 1, wherein the antenna is symmetrical in type.

14. The apparatus for impeding counterfeiting, impeding stealing and managing optical disk stock of claim 1, wherein a material of the antenna is conducting ink or conducting material.

15. The apparatus for impeding counterfeiting, impeding stealing and managing optical disk stock of claim 1, wherein the RFID chip has two poles, and the two poles of the RFID chip contact two ends of the antenna.

16. The apparatus for impeding counterfeiting, impeding stealing and managing optical disk stock of claim 1, wherein the disc is a CD, a DVD, or a Blue-Ray disc.

17. The apparatus for impeding counterfeiting, impeding stealing and managing optical disk stock of claim 1, wherein the foldable matching circuit is located on a side surface of the third annular area of the disc.

18. The apparatus for impeding counterfeiting, impeding stealing and managing optical disk stock of claim 1, wherein a material of the foldable matching circuit is conducting ink or conducting material.

19. An apparatus for impeding counterfeiting, impeding stealing and managing optical disk stock, comprising:
    a disc, including a first annular area, a second annular area and a third annular area, wherein the second annular area is a data recording area with a metal recording layer, the first annular area and the third annular area both are areas without data, the second annular area wraps around the first annular area, and the third annular area wraps around the second annular area;
    a RFID chip embedded in the disc; and
    an antenna connecting to the RFID chip;
    wherein the RFID chip and the antenna are located in the third annular area and the RFID chip is vertically embedded in a peripheral side surface of the third annular area of the disc.

20. The apparatus for impeding counterfeiting, impeding stealing and managing optical disk stock of claim 19, wherein an exterior surface of the RFID chip is aligned with the side surface of the third annular area of the disc.

21. The apparatus for impeding counterfeiting, impeding stealing and managing optical disk stock of claim 19, wherein a quantity of the RFID chip is even and the RFID chip is symmetrically embedded in the disc.

22. The apparatus for impeding counterfeiting, impeding stealing and managing optical disk stock of claim 19, wherein the antenna is pasted on the side surface of the third annular area of the disc.

23. The apparatus for impeding counterfeiting, impeding stealing and managing optical disk stock of claim 19, wherein the antenna is pasted on the side surface, an upper surface and a lower surface of the third annular area of the disc.

24. The apparatus for impeding counterfeiting, impeding stealing and managing optical disk stock of claim 19, wherein the antenna is symmetrical in type.

25. The apparatus for impeding counterfeiting, impeding stealing and managing optical disk stock of claim 19, wherein a material of the antenna is conducting ink or conducting material.

26. The apparatus for impeding counterfeiting, impeding stealing and managing optical disk stock of claim 19, wherein the RFID chip has two poles, and the two poles of the RFID chip contact two ends of the antenna.

27. The apparatus for impeding counterfeiting, impeding stealing and managing optical disk stock of claim 19, wherein the disc is a CD, a DVD, or a Blue-Ray disc.

28. The apparatus for impeding counterfeiting, impeding stealing and managing optical disk stock of claim 19, further comprising a foldable matching circuit connecting to the antenna.

29. The apparatus for impeding counterfeiting, impeding stealing and managing optical disk stock of claim 28, wherein the foldable matching circuit is located on the third annular area of the disc.

30. The apparatus for impeding counterfeiting, impeding stealing and managing optical disk stock of claim 28, wherein the foldable matching circuit is located on an upper surface of the third annular area of the disc.

31. The apparatus for impeding counterfeiting, impeding stealing and managing optical disk stock of claim 28, wherein the foldable matching circuit is located on a lower surface of the third annular area of the disc.

32. The apparatus for impeding counterfeiting, impeding stealing and managing optical disk stock of claim 28, wherein the foldable matching circuit is located on an upper surface and a lower surface of the third annular area of the disc.

33. The apparatus for impeding counterfeiting, impeding stealing and managing optical disk stock of claim 28, wherein the disc comprises an upper annular disc and a lower annular disc, and the foldable matching circuit is pasted on an exterior surface of the upper annular disc.

34. The apparatus for impeding counterfeiting, impeding stealing and managing optical disk stock of claim 28, wherein the disc comprises an upper annular disc and a lower annular disc, and the foldable matching circuit is pasted on an exterior surface of the lower annular disc.

35. The apparatus for impeding counterfeiting, impeding stealing and managing optical disk stock of claim 28, wherein the disc comprises an upper annular disc and a lower annular disc, and the foldable matching circuit is pasted on an exterior surface of the upper annular disc and an exterior surface of the lower annular disc.

36. The apparatus for impeding counterfeiting, impeding stealing and managing optical disk stock of claim 28, wherein a material of the foldable matching circuit is conducting ink or conducting material.

* * * * *